Feb. 11, 1936.  S. P. VAUGHN  2,030,078
HELICOPTER
Filed April 6, 1934   3 Sheets-Sheet 1
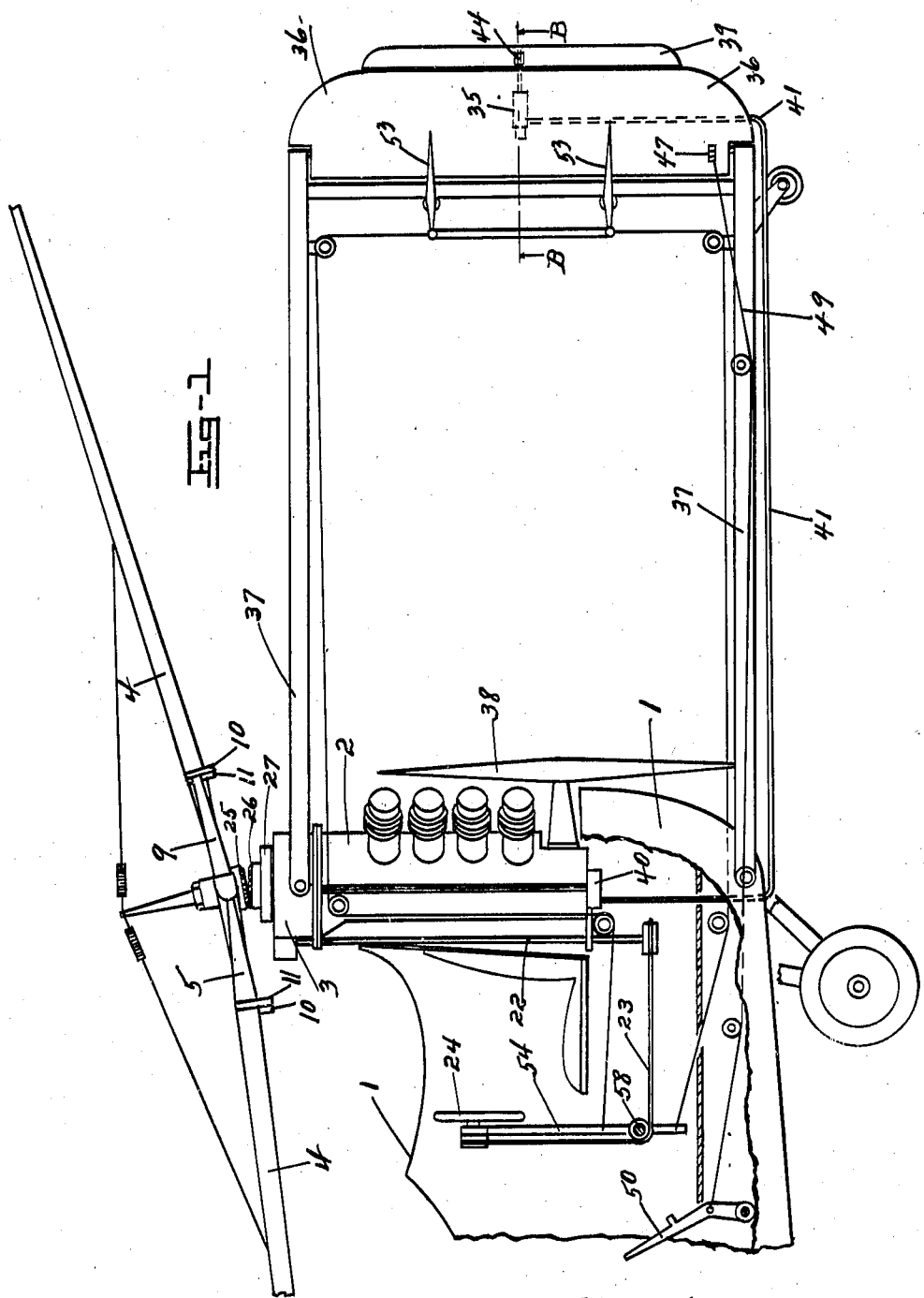
Sidney P. Vaughn INVENTOR Feb. 11, 1936.  S. P. VAUGHN  2,030,078
HELICOPTER
Filed April 6, 1934   3 Sheets-Sheet 2
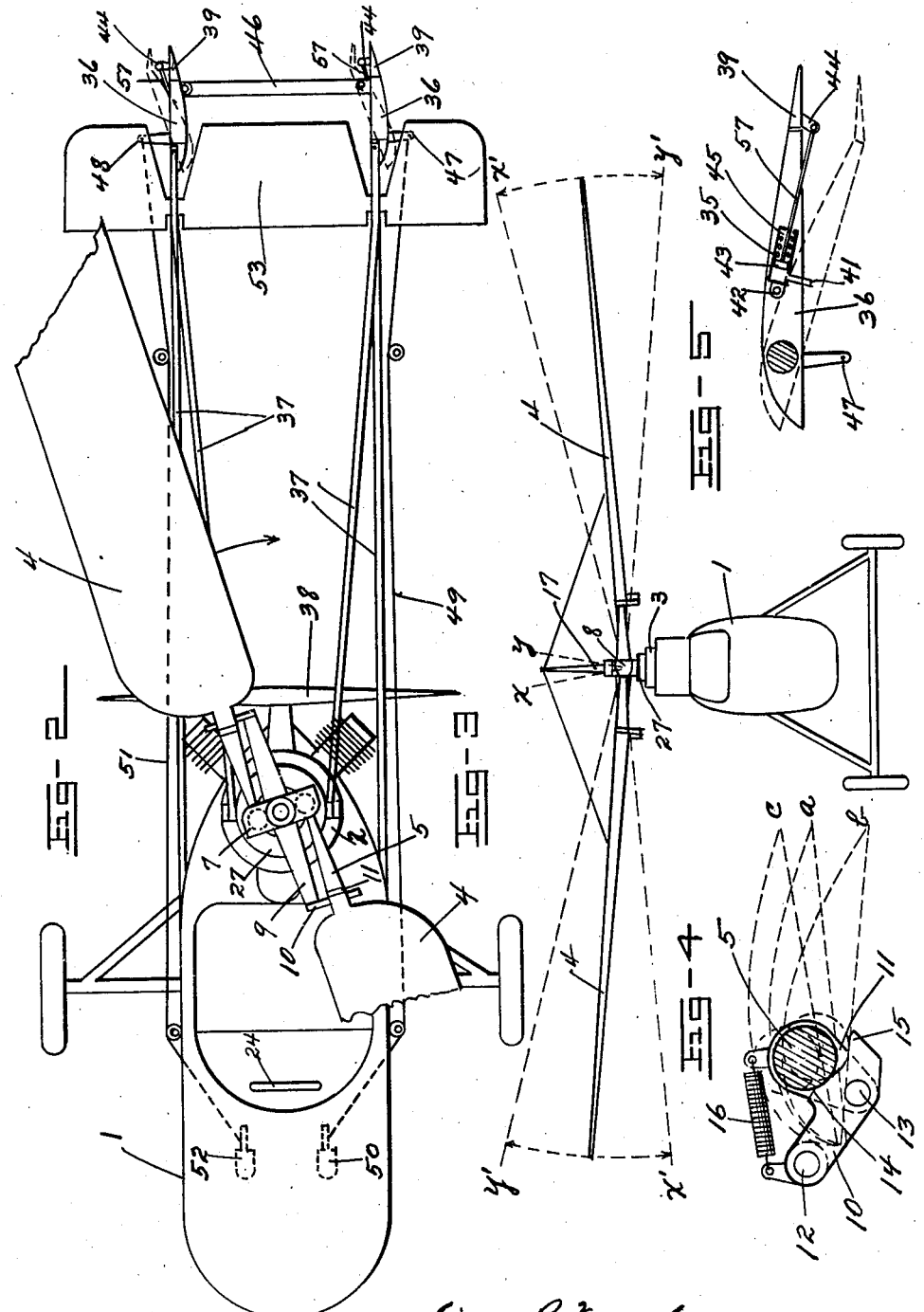
Sidney P. Vaughn INVENTOR

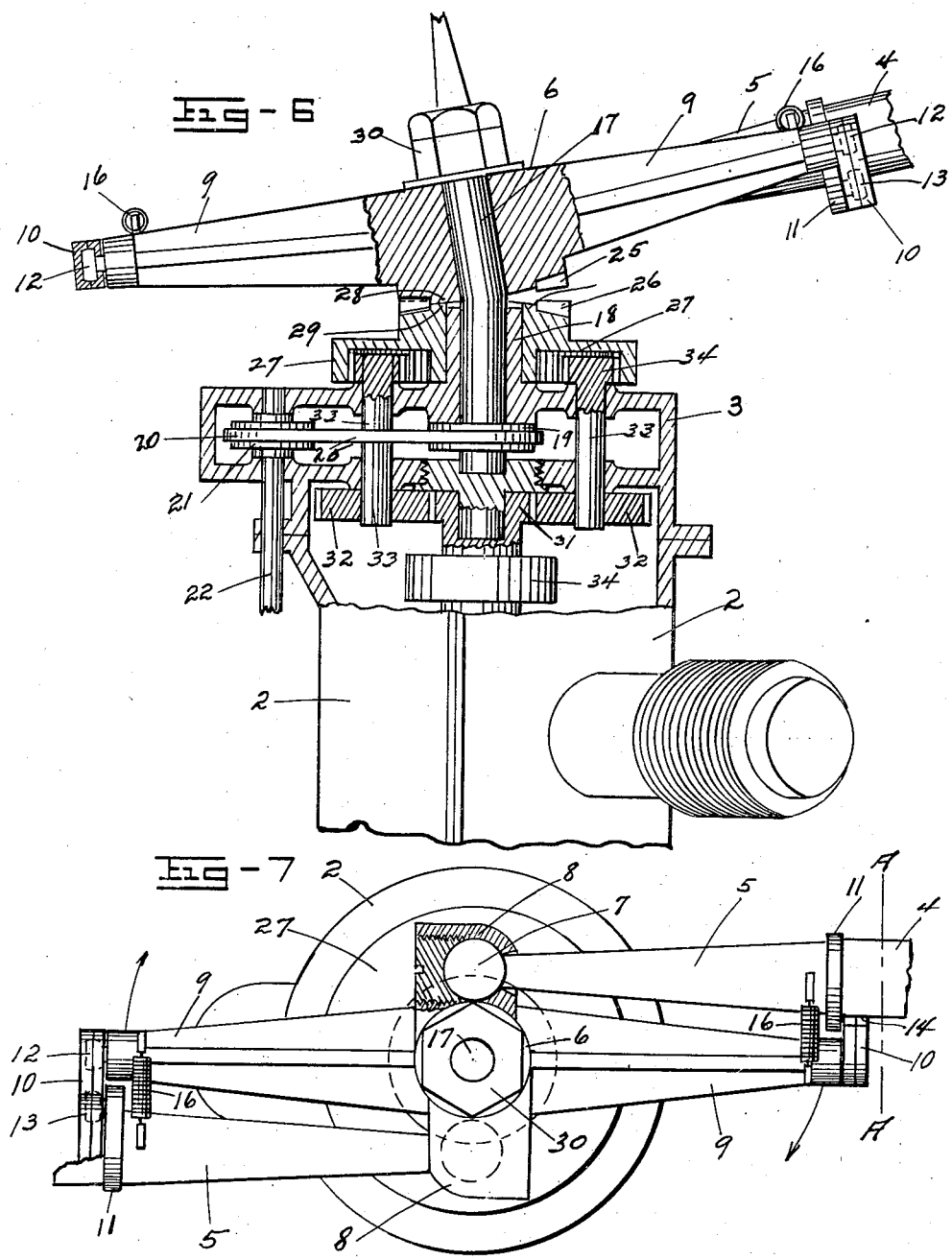

Patented Feb. 11, 1936

2,030,078

UNITED STATES PATENT OFFICE 2,030,078

HELICOPTER

Sidney P. Vaughn, United States Navy, Ackerman, Miss.

Application April 6, 1934, Serial No. 719,360

12 Claims. (Cl. 244—19)

(Granted under the act of March 3, 1883, as amended April 30, 1928; 370 O. G. 757)

I agree that this invention may be manufactured and used by or for the Government for governmental purposes without the payment to me of any royalty thereon.

This invention relates to aircraft of the helicopter type and particularly to a rotating wing system adapted to sustain and propel the aircraft and to obtain a positive and reliable control under all conditions of flight, and also to improved means of neutralizing the reverse or counter torque of the engine which tends to rotate the body in a direction opposite to the rotating wing system.

In the present preferred embodiment of my invention I employ a helicopter having a single sustaining and propelling unit comprising a rotating wing system and automatically actuated counter torque rudders to neutralize the reverse or counter torque imparted to the helicopter body when the engine is driving the rotating wing system. I have shown the wing system as comprising two wings or blades altho any number of wings or blades may be employed.

The principal object of this invention is to provide an improved method of changing the plane of rotation of a single sustaining and propelling unit whereby the helicopter may be propelled in any direction with positive stability and ease of control under all conditions of flight.

Another object is to provide an improved means for automatically actuating counter torque rudders within the influence of the slip stream of a propeller to neutralize or counteract the reverse or counter torque imparted to the body of the helicopter when the engine drives the single sustaining and propelling unit.

Another object is to provide an improved construction for automatically varying the pitch of the blades of the sustaining and propelling unit to meet all conditions of flight, such as outlined in my Patent No. 1,927,966 to which reference should be made.

The foregoing objects and advantages and others apparent to those skilled in the art are obtained by the construction described herein and illustrated in the accompanying drawings, wherein;

Fig. 1 illustrates a longitudinal vertical view of the helicopter cut away in sections to show the controls.

Fig. 2 illustrates a plan view of Fig. 1.

Fig. 3 illustrates an end view of Fig. 1.

Fig. 4 is a section on line A—A Fig. 7 looking toward the hub.

Fig. 5 is a section on line B—B Fig. 1 showing an enlarged sectional view through torque rudders.

Fig. 6 is an enlarged vertical sectional view through gear casing on end of engine and through hub of sustaining and propelling unit.

Fig. 7 is a plan view of Fig. 6 showing torque arms on hub and roots of blades of sustaining and propelling unit.

Like numerals refer to like parts throughout the several views.

Referring to the drawings I have illustrated therein an aircraft of the helicopter type embodying the general principles of my invention, and comprising a body 1, an engine 2 driving a rotatable wing system or sustaining air screw through a reduction gear train carried in a casing 3 attached to the upper end of the engine crank case, together with torque rudders embodied in the tail unit and arranged to automatically neutralize the reverse or counter torque of the engine when driving the sustaining air screw. The rotatable wing system will be hereinafter referred to as a sustaining air screw.

Referring to Figs. 6 and 7, the sustaining air screw comprises two blades 4 having root members 5 universally mounted in a hub member 6 by a ball 7 seated in a socket extension 8 formed in the annular portion of the hub and arranged diametrically opposite to each other. The longitudinal axis of the blade root 5 is positioned approximately parallel to a line tangent to the periphery of the hub 6 in the plane of rotation. A torque arm 9 is provided to drive each blade and they extend radially from the hub at right angles to the bearing socket 8 in front of and parallel to the axis of the blade root 5. The end of the torque arm is connected to the root of the blade by a link system comprising a link 10 universally connecting the end of the arm 9 to a depending arm 11 attached securely to the root of the blade a short distance away from the ball and socket joint. The link 10 is attached to the end of the torque arm by a ball and socket joint 12 and to the end of the depending arm 11 by a ball and socket joint 13 which permits free universal movement of the blade in its ball and socket joint 7 for a limited distance when the blade changes its position relative to the torque arm.

The forward or counter-clockwise movement of the blade around the pivot 13 (see Fig. 4) decreases the pitch of the blade with reference to its plane of rotation and is limited by a stop 14 formed in the upper side of the link 10. The rearward or clockwise movement of the blade around the pivot 13 increases the pitch of the blade and the movement is limited by a stop 15 also formed in the upper edge of the link 10. In addition to the movement around the pivot 13 the blades are free to move in a conical path up and down for a limited distance around the pivot 12 on the end of the torque arm. The movement described is essential to obtain automatic functioning of the blades under all conditions of flight. When a driving torque is applied to the hub tending to rotate the sustaining air screw in the direction indicated by the arrows in Figs. 2 and 7, the drag on the blades causes them to swing clockwise around the pivot 13 and attain a positive pitch as indicated by the dotted lines (b) in Fig. 4, thus producing a lifting force for ascension and propulsion. When the driving torque is removed such as would be the case when the engine stops, the blades will rotate counter clockwise and attain a negative pitch as indicated by the dotted lines (a) and continue rotating in the same direction as a windmill so long as the aircraft is suspended in the air. A spring 16 acting between the blade root 5 and the torque arm 9 applies a constant counter clockwise torque to the blade around the pivot 13 sufficient to keep the blades at a negative pitch when no driving torque is applied.

When a driving torque is applied to the sustaining air screw the blades attain a normal plane of rotation approximately five degrees above a plane at right angles to the torque axis of the hub. This coning of the blades is the resultant of the lift, drag, and centrifugal forces acting upon each blade. In translational flight the advancing blade encounters a greater air pressure than the retreating blade, and the coning angles of the blades will vary with reference to their normal plane of rotation. In order to equalize the lifting forces in the blades regardless of their rotational position, the blades are free to move up and down a limited distance around the pivot 12 on the end of the arm 9 until there is a balance between lift and centrifugal forces, as indicated by the dotted lines (c) in Fig. 4, thus producing a symmetry of lift between advancing and retreating blades. All loads are essentially tensional with the center of lift of the sustaining air screw approximately at the hub. Due to the method of pivoting the blades the entire assembly is practically non-gyroscopic and they may be easily shifted from one plane of rotation to another without setting up a gyroscopic torque tending to upset the helicopter.

The change of direction of rotation of the sustaining air screw is attained by mounting the hub 6 to rotate on the upper straight inclined portion of a bent rotatable control shaft 17 (see Fig. 6), the lower portion of which is straight and rotatably mounted in a tubular bearing 18 extending upwardly from the top end of the gear case 3 and concentric with the vertical axis of the helicopter or engine. The lower end of the shaft 17 has a wheel 19 securely attached thereto which acts as a thrust bearing to support the entire weight of the body in the air. The wheel and shaft are rotated by a belt or chain 20 driven by a second wheel 21 secured to the top end of a shaft 22 which is driven by a belt or chain 23 connected to the steering wheel 24. The under side of the hub 6 has a bevel gear 25 formed therein which meshes with a bevel gear 26 formed in the hub portion of an inverted internally toothed gear 27 mounted to rotate on the tubular bearing 18. The inner portion 28 of the lower side of the air screw hub 6 extends down to the pitch line of the bevel gear 25 and forms a rolling surface contact with a similar surface formed on an inner upward extension 29 of the lower bevel gear 26. The nut 30 holding the hub 6 on the shaft is tightened just enough to obtain a smooth rolling contact between the two rolling surfaces and to take up all play between the nut and the thrust bearing formed by the wheel 19 attached to the lower end of the shaft. This arrangement assures perfect meshing between the two bevel gears and provides a support for the sustaining air screw when at rest. The shaft is bent sharply at a point coinciding with the pitch lines of the two bevel gears and the upper portion on which the sustaining air screw is rotatably mounted is inclined approximately 12 degrees to the vertical axis of the helicopter or engine. With the arrangement shown the direction of the plane of rotation of the sustaining air screw may be readily changed by swinging or rotating the shaft 17 so that the inclined portion will be pointed in the direction it is desired to move. Referring to Fig. 3, if the shaft 17 be rotated so that it points either to the right or the left as indicated by the dotted line (x) and (y) the plane of rotation of the sustaining air screw will be inclined in that direction as indicated by the dotted lines (x') and (y') respectively. Directional control and lateral stability of the helicopter is maintained by changing the direction of the axis of the sustaining air screw as described above. Normally, the sustaining air screw plane of rotation is inclined forward for forward translation as indicated in Fig. 1, which illustrates the flight position of the helicopter.

The sustaining air screw is driven by the engine 2 through a reduction gear train comprising a spur pinion 31, driven by the engine, which drives a spur gear 32 attached to a shaft 33 the upper end of which terminates in a second spur pinion 34 meshing with and driving the internal gear 27. The internal gear 27 drives the sustaining air screw through the bevel gears 25 and 26. Between the gear train and the engine shaft is an overriding clutch in a casing 34 attached to the engine shaft which permits the sustaining air screw to continue rotating in flight with the engine stopped or when its relative speed falls below that of the sustaining air screw. The entire gear train is carried in a gear case 3 attached to the upper end of the engine casing so as to form a compact and reliable power transmitting unit and to reduce the length of the drive shafts to a minimum. The engine is preferably of the V type arranged with the torque axis parallel to or slightly inclined forward of the vertical axis of the body, and with the cylinders extending to the rear, and outside the body of the helicopter. This arrangement makes it possible to cool the cylinders of the engine and to locate all weights around the vertical axis of the body so that the center of gravity will be approximately below the center of lift of the sustaining air screw.

When a helicopter employing a single sustaining air screw is in flight there is present a torque moment tending to rotate the body of the helicopter in a direction opposite to the rotation of the sustaining air screw. I neutralize this torque with a counter torque moment proportional thereto, by providing a tail structure comprising air-foil torque rudders 36 arranged to rock on a vertical axis pivoted to the ends of tail booms 37 extending to the rear of the body 1 and disposed within the influence of a slip stream generated by a pusher propeller 38 driven by the engine driving the sustaining air screw. Since the propeller 38 generates a slip stream proportional to engine torque, the torque rudders may be automatically adjusted with reference to the longitudinal axis of the slip stream to produce a counter torque proportional to the torque tending to rotate the body opposite to rotation of the sustaining air screw. I attain automatic operation of the torque rudders 36 by providing an auxiliary rudder 39 on the trailing edge of the torque rudder 36 and actuating the auxiliary rudder through an angle proportional to the engine torque, which, when acted upon by the slip stream, causes the torque rudder to attain an angle and produce a counter torque moment proportional to engine torque. The auxiliary rudder is automatically actuated by fluid pressure generated by a fluid gear pump 40 driven by the engine. The fluid pressure generated will be proportional to engine torque. The fluid pressure is utilized to actuate the auxiliary rudder through the intermediary of a flexible tube 41 connecting the pump to a fluid motor embodied within the torque rudder. The fluid motor comprises a cylinder 35 pivoted by its closed end 42 (see Fig. 5), and a piston 43 driving a piston rod 57 extending through the open end of the cylinder and connected to a torque arm 44 attached to the auxiliary rudder. A compression spring 45 acting between the piston and the open end of the cylinder keeps the auxiliary rudder in a neutral position when not actuated by fluid pressure. By virtue of the arrangement described the torque rudder will attain a position relative to the axis of the slip stream and produce a counter torque moment proportional to the reverse torque of the engine. While I have generated and utilized a fluid pressure proportional to engine torque to automatically actuate the torque rudders, it is evident that a generator may be substituted for the fluid pump and an electric motor substituted for the fluid motor to obtain practically the same results.

Flight conditions will arise which will make it necessary for the pilot to manually actuate the rudders for directional control. For this purpose the usual manually actuated rudder controls are provided and comprise cables 49 and 51 connecting the foot pedals 50 and 52 to torque rudder horns 47 and 48. The two torque rudders are connected by a link 46 so that they are actuated as one rudder. Regardless of the angle attained automatically by the torque rudders 36 they may be manually actuated by the pilot to increase or decrease the torque moment.

The usual horizontal rudders 53 are provided also to regulate the angle of attack of the sustaining air screw for ascent or descent. The rudders are connected by cables to a control stick 54 pivoted for longitudinal rocking movement and actuated by the pilot.

Fig. 1 illustrates the approximate attitude of the helicopter in forward flight. Should it be desired to attain a hovering attitude or to move backward, the horizontal rudders 53 are manipulated to depress the tail and change the angle of attack of the sustaining air screw until the helicopter stalls or starts to move backward. Since the tail unit is within the influence of the slip stream generated by the propeller 38, directional control and control for ascent and descent is positive for all conditions of flight so long as the engine is running or the helicopter is moving through the air.

Lateral control is attained by swinging the axis of the sustaining air screw as described above. Should the engine stop while the helicopter is in a stalled attitude the helicopter may be placed in a forward glide by swinging the axis of the sustaining air screw either to right or left of the longitudinal axis of the body which will cause the helicopter to start moving in that direction in a spiral. When sufficient speed has been attained to make the controls in the tail unit effective the helicopter can be brought under control. If necessary the axis of the sustaining air screw may be swung through an arc of 180 degrees and the helicopter run backward. The helicopter may be made to rise vertically by manipulating the controls to keep the sustaining air screw in a stalled attitude with reference to lateral translation. When sufficient altitude has been attained raising the tail will reduce the angle of attack of the sustaining air screw and cause the helicopter to move forward. Lowering the tail will cause the helicopter to move backward. Changing the direction of the axis of the sustaining air screw will cause the helicopter to move in that direction. From the above description it will be seen that a helicopter has been provided that includes means to attain every condition of flight that may be desired.

It is apparent that many modifications in structural arrangement and application of the principles described may be made without departing from the spirit and scope of the following claims.

I claim:

1. In an aircraft of the character described, a supporting rotatable shaft bent to form two oblique intersecting axes, means for rotatably mounting one axis in the aircraft parallel with the vertical axis of the aircraft and arranged to support the body of said aircraft, a sustaining airscrew rotatably mounted on the upper inclined portion of said shaft so that its torque axis will be oblique to the vertical axis of the aircraft, means for turning said shaft in its mounting to effect a change in direction of said torque axis and the plane of rotation of said sustaining air screw for control purposes, and means for driving said sustaining air screw.

2. An aircraft as described in claim 1 wherein the means for driving the sustaining air screw comprises, an engine, an overriding clutch between engine and the sustaining air screw, a train of reduction gears driven by the engine, a bevel gear attached to the lower side of the hub of the sustaining air screw and concentric with its torque axis, a second bevel gear mounted concentrically with that portion of the rotatable shaft mounted parallel with the vertical axis of the aircraft and meshing with the bevel gear in said hub, said second bevel gear being driven by the engine through the train of reduction gears.

3. In an aircraft, a shaft bent to form two oblique intersecting axes, means for mounting said shaft in said aircraft to rotate on one of its axes, an airscrew mounted to rotate on the other axis of said shaft, means for turning said shaft in its mounting to change the direction of axis of rotation of said airscrew, and means for driving said airscrew.

4. In an aircraft, a shaft bent to form two axes oblique to each other, means for mounting said shaft to rotate or turn on one of its axes and arranged to support said aircraft, a wing system mounted to rotate on the other axis of said shaft, means for turning said shaft in its mounting to change the direction of axis of rotation of said wing system and to change the plane of rotation, and means for rotating said wing system to produce a thrust.

5. In an aircraft, the combination with a body, an engine, control surfaces, landing gear, of a shaft bent to form two oblique axes or two axes oblique to each other, means for mounting said shaft in said body to rotate on one of its axes and to support the aircraft, a wing system rotatably mounted on the other axis of said shaft to support the aircraft in flight, and means for turning said shaft in its mounting to change the direction of axis of rotation of the wing system for control purposes.

6. An aircraft as described in claim 1 and including means whereby the engine drives the wing system.

7. An aircraft as described in claim 1 and including means whereby the engine drives the wing system through a clutch and a train of gears and wherein the rotatable shaft is mounted to rotate in an extension of the engine casing.

8. In an aircraft, a supporting axis structure having a portion inclined at an angle to the remaining portion mounted to rotate on a fixed axis oblique to the axis of the inclined portion, a sustaining air screw mounted for rotation on said inclined portion, and means for turning said axis structure in its mounting to change direction of axis of rotation and plane of rotation of said sustaining air screw for control purposes.

9. An aircraft as described in claim 8 and including means for driving said sustaining air screw.

10. In an aircraft, the combination with a body, a sustaining rotating wing system, an engine for driving said wing system, a propeller driven by said engine at a speed proportional to the speed of said sustaining air screw, control surfaces comprising vertical and horizontal rudders disposed within the influence of the slip stream of said propeller, of auxiliary rudders pivoted to the trailing edge of the vertical rudder to actuate it, a fluid motor driven by fluid pressure to actuate said auxiliary rudder, and a fluid pump driven by the engine to generate a fluid pressure proportional to engine torque, connecting means to utilize the fluid pressure generated by the fluid pump to drive the motor actuating the auxiliary rudder, the auxiliary rudder being arranged to actuate the vertical rudder to produce a torque neutralizing the reacting torque of the sustaining air screw, and manually operated means to actuate the vertical rudder to increase or decrease the neutralizing torque for control purposes.

11. In an aircraft, the combination of a body, a sustaining air screw, a pusher propeller, an engine driving said sustaining air screw and pusher propeller, a tail unit within the influence of the slip stream of the pusher propeller and comprising horizontal rudders actuated for ascent and descent control, vertical rudders for directional control and to produce a torque moment neutralizing the reacting torque of the sustaining air screw, auxiliary rudders for actuating said vertical rudder, and power means generated by the engine to actuate said auxiliary rudder and to cause said vertical rudder to produce a torque moment neutralizing the reacting torque of the sustaining air screw.

12. An aircraft as described in claim 11 and including means for manually actuating the vertical rudders to produce an increase or decrease in the torque moment for directional control purposes.

SIDNEY P. VAUGHN